E. EHLICH.
SAFETY PIN.
APPLICATION FILED MAY 18, 1920.
1,433,678.  Patented Oct. 31, 1922.
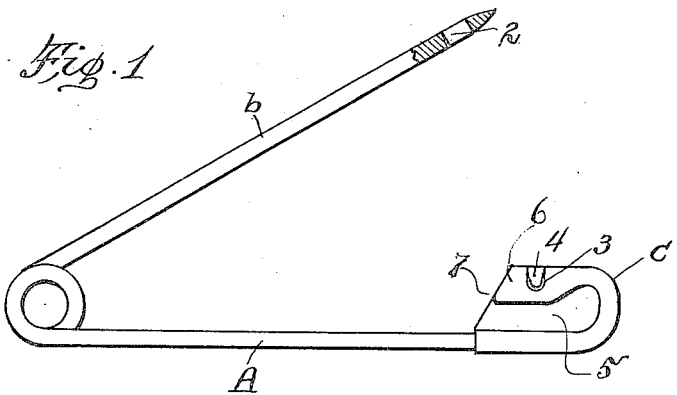
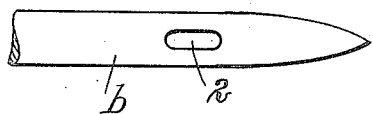
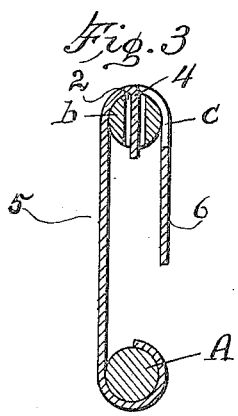
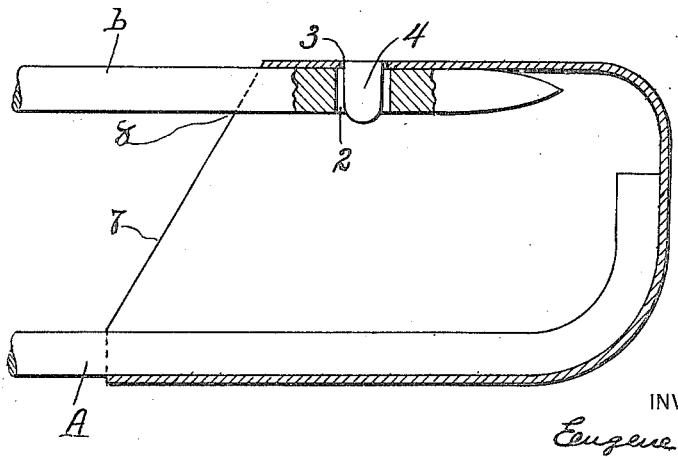
INVENTOR
Eugene Ehlich
BY
F. N. Gilbert
ATTORNEY Patented Oct. 31, 1922.

1,433,678

UNITED STATES PATENT OFFICE.

EUGENE EHLICH, OF ENDICOTT, NEW YORK, ASSIGNOR TO UNIVERSAL INSTRUMENTS AND METAL COMPANY, INC., OF UNION, NEW YORK.

SAFETY PIN.

Application filed May 18, 1920. Serial No. 382,392.

*To all whom it may concern:*

Be it known that I, EUGENE EHLICH, a citizen of the United States, residing at Endicott, in the county of Broome and State of New York, have invented certain new and useful Improvements in Safety Pins, of which the following is a specification.

My invention has reference to improvements in fastening devices, particularly, to the provision of a so-called safety pin, the principal object of the invention being to provide a safety pin employing a novel and advantageous form of guard or catch for receiving and retaining the penetrating end of the pin when the same is in its closed or locked position, preventing undue or accidental disengagement with the matter secured thereby, and also being capable of being quickly and positively locked or closed.

It is also an object of the invention to provide the safety pin with a form of guard or catch which will limit movement of the penetrating end of the pin proper as the same is introduced thereinto, in order that such portion will have positive and ready engagement with the guard and will facilitate closing of the same.

Other objects will be in part obvious and in part pointed out hereinafter.

In order that the invention and its advantages may be readily understood, I have in the accompanying illustrative drawings and in the detailed following description based thereon, set out a preferred embodiment of the same.

In these drawings:

Figure 1 is a side elevation of the improved safety pin in its open position;

Figure 2 is a fragmentary detail in elevation of a portion of the pin proper;

Figure 3 is a transverse section through the guard of the pin; and

Figure 4 is an enlarged fragmentary detail partly in section showing the engagement of the catch with the pin proper.

Having more specific reference to the drawings in connection with which like reference characters will designate corresponding parts throughout, the improved safety-pin comprises the usual body or a basal portion A composed of a single piece of spring wire having one of its ends bent upwardly as at 1, while the opposite end thereof is coiled at *a* and formed with a pin proper *b* having its free end sharpened and provided with an opening 2, adapted to penetrate the material to be secured by the safety pin.

Over the upwardly curved end of the basal portion, indicated at 1, I arrange a guard C formed of sheet metal and having the side wall 6 thereof open for a distance sufficient to permit the introduction of the pin proper thereinto, while the remaining side 5 is closed or is solid and serves to limit the movement of the pin proper as the same is laterally moved into engagement with said guard. The inner end of the guard is beveled or inclined as at 7 whereby to lessen liability of the catching of the pin in fabrics or other matter engaged by the safety pin.

As means for positively securing the pin proper against undue or accidental disengagement from the guard C, a tongue 4 is struck downwardly from the upper portion of said guard and as will be noted, is positioned between the opposite side walls of the same, being of a size to have snug engagement in the opening 2 of the pin proper *b*. Thus, when the penetrating portion of the pin is engaged in the guard C, it will be prevented from having accidental disengagement therefrom, since the tongue 4 will, obviously, prevent any attempt at lateral movement thereby. However, when desiring to disengage the pin *b* from the guard C, it is only necessary to flex the same downwardly for a distance sufficient to remove the tongue 4 from the opening 2, whereupon, the said pin *b* may be then laterally disengaged from its guard C.

The guard C may be secured to the curved end 1 of the basal portion in any suitable manner, but I prefer that the same be engaged therewith by bending the lower part of the sheet metal guard thereover, as at 8.

It is to be noted that the size of the guard C, in cross section, is such as will snugly receive the free portion of the pin *b* therein, hence, eliminating any movement or play of the same which would tend toward permitting its disengagement from the guard. Further, since the pin *b* is formed of spring material, it will be appreciated that the same when engaged in the guard C will be placed under tension sufficient to maintain the same in connection with the tongue 4.

Manifestly, the construction shown is capable of considerable modification and such modification as is within the scope of my claim, I consider within the spirit of my invention.

I claim—

A safety pin comprising a body, a pin proper formed on the body having an opening in its free end, a sheet metal guard engaged with one end of the body and its inner end beveled, said guard formed with parallel sides spaced apart a trifle in excess of the thickness of the pin, one of the sides of the body portion being formed with a slot to permit the lateral insertion of the pin, the other side being solid and a tongue struck up from the guard and depending from the upper portion thereof for engagement in the opening in the pin proper, the solid wall of the guard serving as a guide for the pin in its upward movement to receive the tongue, the beveled inner end of the guard serving to direct the material of the garment in which the pin is used upwardly against the pin proper to lock it in position.

In testimony whereof I have affixed my signature.

EUGENE EHLICH.